Sept. 14, 1937.    H. McCARTHY ET AL    2,093,091
VALVE
Filed May 12, 1936

INVENTORS
Harry McCarthy &
French H. Morehead
BY
Albert J. Henderson
ATTORNEY.

Patented Sept. 14, 1937

2,093,091

UNITED STATES PATENT OFFICE 2,093,091

VALVE

Harry McCarthy, Kewanee, Ill., and French Hugh Morehead, New York, N. Y., assignors to Walworth Patents, Inc., Boston, Mass., a corporation of Massachusetts Application May 12, 1936, Serial No. 79,264

5 Claims. (Cl. 251—93)

This invention relates to valves and more particularly to lubricated plug valves. Plug valves, when properly lubricated on the seating surfaces to eliminate leakage and sticking, are desirable for use in certain services where high pressures in the line are encountered. In such services, however, the plug member when in closed position tends to tilt or move bodily in the valve body away from the upstream side and toward the downstream side, regardless of the extreme care which is used in manufacture to insure a close fit between the seating surfaces of these members.

It will be apparent that under such circumstances lubricant fed to both sides of the valve will tend to flow in the easiest path between the seating surfaces on the upstream side where a small clearance exists. Such lubricant would therefore be wasted and sufficient pressure could not be built up in the lubricant system to free the plug from its seat and render it easy to rotate.

It is an object of this invention to insure that lubricant will reach only the side of the valve which requires it.

Another object of the invention is to provide a single source from which lubricant may be supplied to the seating surfaces on any side of the valve.

Another object of the invention is to distribute lubricant to the entire seating surface in the open position while restricting the distribution in the closed position.

Another object of the invention is to seal completely around the fluid passageways in both open and closed positions.

Another object of the invention is to prevent line fluid from washing out the lubricant in the system when the plug is rotated from one position to another.

Other objects and advantages will become apparent from the following description taken in connection with the accompanying drawing wherein:—

Figure 2:
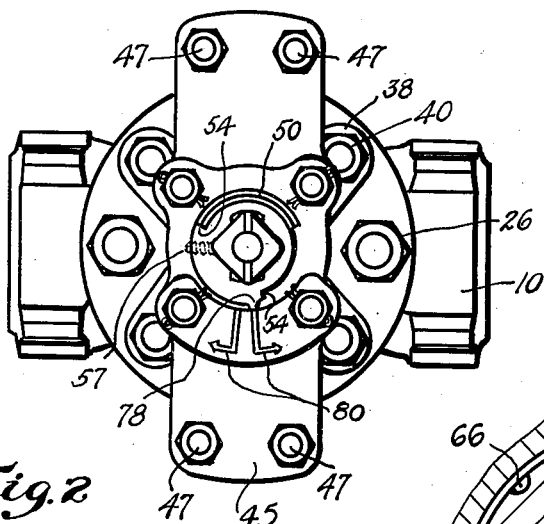
Fig. 2 is a plan view of the valve.

Referring more particularly to the drawing, the valve comprises a body member 10 having a tapered valve seat 12 provided with fluid passageways 14 and 16 extending transversely thereof.

The fluid passageways 14 and 16 extend from the valve seat 12 completely through the ends of the body 10 and may be provided with internal threaded portions 18 or other suitable connecting means for securing the valve in a pipe line. At the larger end of the valve seat 12 is a recess 20 provided for the reception of part of an annular cover 22 which is secured to the body 10 by means of the studs 24 and nuts 26.

Seated in the body 10 and rotatably engaging the valve seat 12 is a tapered plug member 28 having a port 30 extending transversely therethrough and being adapted to register with the passageways 14 and 16 when the valve is in open position. A stem 32 extends from the larger end of the plug member 28 through the cover 22, a portion of which is recessed as at 34 for the reception of a packing 36. The packing may be compressed into engagement with the stem 32 by means of a gland 38 which is adjustable by means of the nuts 40 engaging studs 41 projecting from the body 10 through the cover 22 and the gland 38.

In this embodiment of the invention the plug member 28 is retained in its seat by the provision of an anti-friction bearing 42 which is seated on a retainer member 44 engaging a shoulder 46 on the stem 32 beyond the packing gland 38. The bearing 42 and retainer 44 are enclosed by a yoke 45 adjustable on studs 47 projecting from the gland 38 and the yoke is provided with a cap 48 having a flange 49 engaging the bearing 42. The yoke cap 48 secured to the yoke 45 by means of studs 51 and nuts 53 is provided with an arcuate projection 50 concentric with the axis of the stem 32. A collar 52 is seated on a shoulder 55 formed on the stem 32 and provided with a pair of spaced abutments 54 which are adapted to be moved into engagement with the stop 50 to limit rotation of the valve member to substantially ninety degrees from full-open to full-closed position. To prevent movement of the collar 52 relative to the stem 32 the collar is provided with a non-circular opening, preferably of square form, to engage a squared end 56 formed on the stem 32 beyond the shoulder 55 upon which the collar is seated. Longitudinal movement of the collar 52 is prevented by a set screw 57 extending through the collar and engaging the stem. A portion of the squared end 56 of the stem 32 projects beyond the collar 52 and may be engaged by a wrench or other tool for rotating the valve member 28 in its seat.

The valve seat 12 formed in the body 10 is provided with a pair of diametrically opposite transverse lubricant grooves 58, each of which is located above one of the fluid passageways 14 and 16 respectively, said grooves together substantially surrounding the seating surface but having blind ends providing a pair of lands 60 therebetween. The seating surface 12 is further provided with a pair of diametrically opposite transverse lubricant grooves 62, each located below one of the fluid passageways 14 and 16 and having blind ends similar to the lubricant grooves 58 which are positioned thereabove. Furthermore, the valve seat 12 is provided with four longitudinal grooves 64 which are located on each side of the passageways 14 and 16 between the transverse grooves 58 and 62 at each end of the body but terminating short of connection with these transverse grooves.

One end of the seating surface of the plug member 28 is, in this instance, provided with eight dwarf grooves 66, four of which are located above the port 30 in the valve member 28 and the remaining four therebelow. These dwarf grooves 66 are arranged in pairs at either end of the longitudinal grooves 64 and are adapted to overlie the ends of the longitudinal grooves 64 and the transverse grooves 58 and 62 when the valve is in full-open or full-closed position. When the valve member 28 is rotated in the valve seat 12 from the full-open or full-closed positions, the dwarf grooves 66 therein are immediately disconnected from communication with the longitudinal grooves 64 and thus the complete framing of the passageways is no longer present. However, during the rotating movement of the plug two diametrically opposite longitudinal grooves 64 will be exposed to the fluid in the line as the port 30 passes across them. For this reason it has been arranged that these exposed grooves shall be cut off, as described, from the lubricant supply during this period. In order to render the valve rotatable in either clockwise or counter-clockwise direction without exposing any lubricant grooves to the fluid in the line, all of the longitudinal grooves 64 have been arranged to terminate short of the transverse grooves 58 and 62 and thus achieve this object.

Figure 3:
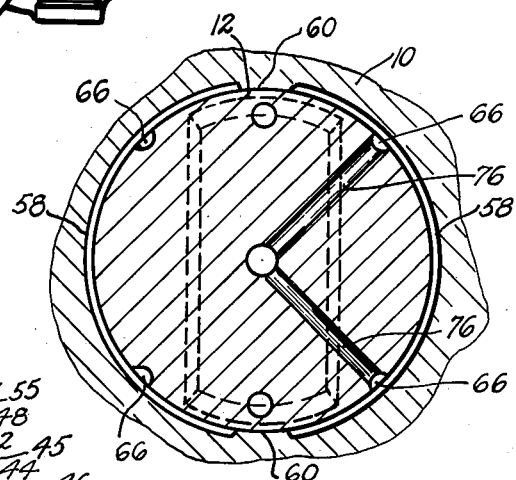
Fig. 3 is a section taken on the line 3—3 of Fig. 1 looking in the direction indicated by the arrows.

Lubricant is supplied to the grooves from an axial reservoir 68 formed in the upper portion of the valve stem 32. The reservoir 68 is threaded for the reception of a compressor screw 70 and is provided with a check valve 72 to prevent regress of lubricant therefrom when the compressor screw 70 is removed. The reservoir 68 communicates with a passage 74 extending axially of the stem and terminating in the upper portion of the valve member 28. Communicating with the passage 74 is a pair of ducts 76 extending radially therefrom to a pair of adjacent dwarf grooves 66 on one side of the upper portion of the valve member 28. Hence the ducts 76, in the closed position of the valve as shown in Fig. 3, communicate only with the lubricant grooves surrounding the passageway 16 and there is no communication between the lubricant reservoir and the grooves surrounding the passageway 14.

In order to indicate which side of the valve is in communication with the lubricant reservoir 68 the collar 52 is provided with a pointer 78 and the yoke cap 48 is provided with suitable indicia comprising a pair of arrows 80 indicating the passageways 14 and 16 respectively. Preferably, the shaft portions of the arrows 80 are spaced approximately seven degrees on either side of the median line of the plug port 30 when in closed position and the pointer 78 is offset from said median line an equal amount in order that it may lie opposite one of the arrows 80 when the plug is in said closed position.

Figure 1:
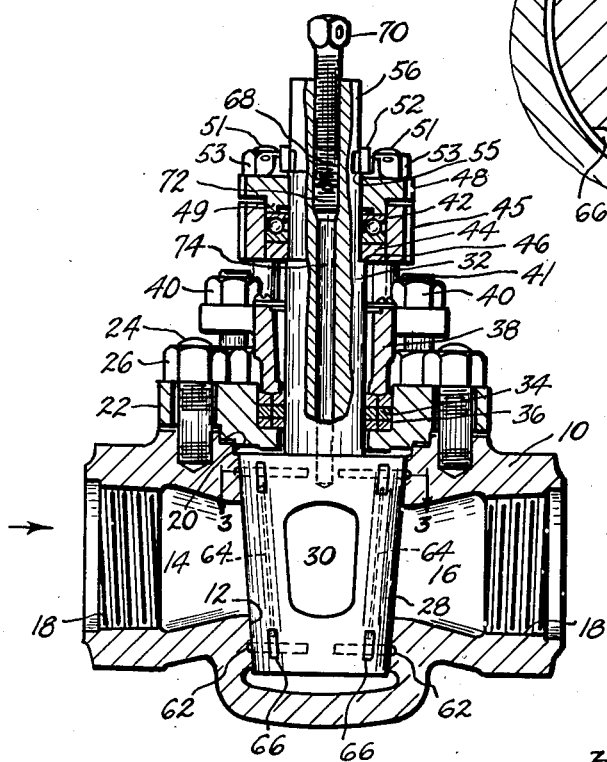
Fig. 1 is a front view, partly in section, of a valve embodying the invention.

When the valve is used to close a pipe line carrying fluid under high pressure any tendency of the pressure on one side of the valve to tilt or move the valve member 28 bodily in its seat will not prevent the valve from being lubricated. Assuming that the passageway 14 is on the upstream side of the valve and the line fluid is consequently entering from the direction indicated by the arrow in Fig. 1, it is apparent that the valve member 28 may be moved into close engagement with that part of the valve seat 12 adjacent passageway 16 on the downstream side, owing to the difference in pressure at each end of the valve. Hence, it is desirable that the closely engaged part of the valve member and its seat be lubricated before the valve is rotated. This can be accomplished by operation of the compressor screw 70 to force lubricant from the reservoir 68 through the passage 74 for distribution through the ducts 76 to the lubricant grooves surrounding the passageway 16 on the downstream side of the valve. In view of the fact that there is no communication between the reservoir 68 and the grooves surrounding the passageway 14 on the upstream side no lubricant is wasted by escaping through the clearance between the valve member and its seat on this side of the valve and thus into the line. The valve member may be rotated in a counter-clockwise direction from the closed position shown in the drawing to the open position which is an angular movement of ninety degrees limited by the engagement of an abutment 54 with the stop 50. The lubricant ducts 76 will also be moved ninety degrees from the position shown in Fig. 3. Consequently, these ducts will lie on either side of the land 60, one communicating with the grooves surrounding the passageway 16 while the other communicates with the grooves surrounding the passageway 14. In this position of the valve there is, of course, no tendency for line fluid to tilt or otherwise move the plug member 48 bodily toward one side of the valve seat. Consequently, there is no reason for restricting the distribution of lubricant to only one side of the seating surfaces. From the foregoing description of the grooving arrangement disclosed herein it will be apparent that provision has been made for automatically removing the restrictions upon the lubricant distribution as soon as the plug member is moved to open position.

It often happens, however, that in the use of these valves the direction of fluid flow is changed and the upstream becomes the downstream side of the valve. In such case the opposite side of the valve will require lubricating in the closed position. This can be readily accomplished by removing the collar 52 and rotating the plug member one hundred and eighty degrees from the position shown in the drawing. The valve member 28 will then be in closed position but the lubricant ducts 76 will communicate with the grooves surrounding the passageway 14 while there will be no communication between the reservoir and the grooves surrounding the passageway 16. The collar 52 can then be reversed so that the pointer 78 lies on the opposite side of the median line through the plug port and is thus aligned with the arrow 80 on that side. At the same time, the abutments 54 on the collar 52 will be reversed so that the valve member 28 must be moved in a clock-wise direction from closed to open position. As in the instance previously described the abutments 54 and stop 50 will function to limit the rotation of the plug member to ninety degrees and thus there is no danger of the lubricant ducts 76 communicating with the upstream side of the valve in the closed position.

It will be understood that the location of the lubricant grooves is not limited to the arrangement described herein. It will be apparent that the grooves shown and described as being in the valve seat could equally well be placed in the valve member while the grooves in the valve member could be formed in the valve seat. The location of the individual grooves is therefore immaterial as long as the exposed longitudinal grooves are cut off from the lubricant supply as described.

From the foregoing it will be apparent that a valve constructed as described has a wide field of usefulness. Both sides of the valve can be completely lubricated when the valve is in open position and adequate lubrication is afforded on the side receiving lubricant in the closed position. Any change in the direction of the fluid flow requires only a simple operation to change the direction of the lubricant flow. In both the full-open and full-closed positions of the valve the body passageways are completely framed by lubricant grooves, but if in the closed position the line fluid enters on one side it cannot travel around to the other side and thus destroy the seal at both ends of the body.

We claim:

1. A lubricated plug valve comprising a body member having passageways for line fluid and a valve seat intermediate said passageways, a valve member rotatable in said seat and having a port adapted to register with said passageways when the valve is in the open position, a lubricant reservoir associated with said valve, means to distribute lubricant from said reservoir to the seating surfaces of said body and valve members, said means comprising separate lubricant grooves around each of said body passageways, a lubricant duct extending from said reservoir and being adapted to communicate with the grooves around any individual body passageway in the closed position of the valve, and adjustable means for limiting said communication to the grooves around a predetermined body passageway.

2. A lubricated plug valve comprising a body member having passageways for line fluid and a valve seat intermediate said passageways, a valve member rotatable in said seat and having a port adapted to register with said passageways when the valve is in open position, a stem extending from the valve member and provided with a lubricant reservoir, means to distribute lubricant from said reservoir to the seating surfaces of said body and valve members, said means comprising separate lubricant grooves around each of said body passageways, a lubricant duct in said valve members extending radially from said reservoir and being adapted to communicate with the grooves around any individual body passageway in the closed position of the valve, and adjustable means on said stem for limiting said communication to the grooves around a predetermined body passageway.

3. A lubricated plug valve comprising a body member having passageways for line fluid and a valve seat intermediate said passageways, a valve member rotatable in said seat and having a port adapted to register with said passageways when the valve is in open position, a stem extending from the valve member and provided with a lubricant reservoir, means to distribute lubricant from said reservoir to the seating surfaces of said body and valve members, lubricant ducts in said valve member extending radially from said reservoir and being adapted to communicate with the grooves around any individual body passageway in the closed position of the valve, a stop carried by said valve, means adjustable on said stem and cooperating with said stop for limiting said communication to the grooves around a predetermined body passageway, and an indicator associated with said means for indicating the position of the lubricant ducts.

4. A lubricated plug valve comprising a body member having passageways for line fluid and a valve seat intermediate said passageways, a valve member rotatable in said seat and having a port adapted to register with said passageways when the valve is in open position, a stem extending from the valve member and provided with an axial lubricant reservoir, means to distribute lubricant from said reservoir to the seating surfaces of said body and valve members, said means comprising separate lubricant grooves around each of said body passageways, a pair of lubricant ducts extending radially from said reservoir on one side of said valve member and communicating with the grooves around the adjacent body passageway in the closed position of the valve, said ducts communicating with all of said grooves when the valve member is rotated to open position, a stop carried by said valve body adjacent said stem, means rotatable with said stem and cooperating with said stop for limiting rotative movement of the valve member to substantially ninety degrees between the full-open and full-closed positions, and a pointer on said means cooperating with indicia on a stationary part of the valve body for indicating the position of the lubricant ducts.

5. A lubricated plug valve comprising a body member having passageways for line fluid and a valve seat intermediate said passageways, a valve member rotatable in said seat and having a port adapted to register with said passageways when the valve is in open position, a stem extending from the valve member and provided with an axial lubricant reservoir, means to distribute lubricant from said reservoir to the seating surfaces of said body and valve members, said means comprising separate lubricant grooves around each of said body passageways, a pair of lubricant ducts extending radially from said reservoir on one side of said valve member and communicating with the grooves around the adjacent body passageway in the closed position of the valve, said ducts communicating with all of said grooves when the valve member is rotated to open position, a stop carried by said valve body adjacent said stem, a collar on said stem having abutments thereon for engaging said stop and limiting rotative movement of the valve member to substantially ninety degrees between full-open and full-closed positions, said collar being removable to permit rotation of said valve member beyond said ninety degrees and afford communication between the lubricant ducts and the grooves around another body passageway in the closed position, and a pointer on said collar offset from the median line of said valve port and cooperating with indicia on a stationary part of the valve body for indicating the position of the lubricant ducts, said pointer being reversible with said collar for cooperation with other indicia when the position of the lubricant ducts in closed position is changed.

HARRY McCARTHY.
FRENCH HUGH MOREHEAD.